(12) United States Patent
Ochiai et al.

(10) Patent No.: US 7,412,229 B2
(45) Date of Patent: Aug. 12, 2008

(54) SALES APPARATUS AND METHOD OF TRANSMITTING AND RECEIVING MERCHANDISE INFORMATION BY ELECTRIC FIELD INDUCED IN HUMAN BODY

(75) Inventors: Katsuyuki Ochiai, Atsugi (JP); Mitsuru Shinagawa, Isehara (JP); Hiroyoshi Togo, Tokorozawa (JP); Tadashi Minotani, Atsugi (JP)

(73) Assignee: Nippon Telephone and Telegraph Corporation (JP)

( * ) Notice: Subject to any disclaimer, the term of this patent is extended or adjusted under 35 U.S.C. 154(b) by 500 days.

(21) Appl. No.: 10/676,943

(22) Filed: Sep. 30, 2003

(65) Prior Publication Data

US 2004/0067763 A1    Apr. 8, 2004

(30) Foreign Application Priority Data

Oct. 2, 2002    (JP)    ............................ P2002-289857

(51) Int. Cl.
*H04M 1/66*    (2006.01)
*G05B 19/00*    (2006.01)
*G06Q 20/00*    (2006.01)
*G06G 1/12*    (2006.01)
*H04K 1/00*    (2006.01)

(52) U.S. Cl. .................... 455/410; 340/5.9; 705/16; 705/21; 705/65

(58) Field of Classification Search ................. 455/420, 455/88, 557, 575.6, 41.2, 90.1, 414.1, 410; 705/1, 26, 17, 40, 16, 65–68; 340/5.61, 5.62, 340/5.64, 5.9–5.92, 539.11–13, 5.2; 235/380, 235/381, 383, 385; 345/173; 341/20, 22, 341/31, 32

See application file for complete search history.

(56) References Cited

U.S. PATENT DOCUMENTS 3,407,388 A * 10/1968 Goldman ...................... 360/4

(Continued)

FOREIGN PATENT DOCUMENTS

EP        0 843 425 A    5/1998

(Continued)

OTHER PUBLICATIONS

Fukumoto, et al., "Wireless FingeRing: A Body-coupled Wearable Keyboard", *Information Processing Society of Japan Journal*, vol. 39, No. 5, pp. 1423-1430 (1998).

(Continued)

*Primary Examiner*—George Eng
*Assistant Examiner*—Nam Huynh
(74) *Attorney, Agent, or Firm*—Kilpatrick Stockton LLP (57) ABSTRACT

The button apparatus is an apparatus provided for, for example, a vending machine and to be touched and pressed with the body of a user who wants to purchase a commodity from the vending machine. By pressing down the button apparatus, the user can purchase a required commodity from the vending machine. The button apparatus has a conductive pusher, an insulator, a switch, and a transceiver. A user wearing a wearable computer and a user's transceiver touches and presses down the pusher, to separately establish communication between the transceiver and the user's transceiver through the conductive pusher and the body of the user, as well as communication of providing a press signal.

2 Claims, 6 Drawing Sheets

U.S. PATENT DOCUMENTS

| | | | | |
|---|---|---|---|---|
| 5,287,089 A | * | 2/1994 | Parsons | 345/156 |
| 5,796,827 A | * | 8/1998 | Coppersmith et al. | 713/182 |
| 6,104,913 A | | 8/2000 | McAllister | |
| 6,441,721 B1 | * | 8/2002 | Tajima et al. | 340/286.01 |
| 6,684,200 B1 | * | 1/2004 | Koga | 705/71 |
| 6,771,161 B1 | * | 8/2004 | Doi et al. | 340/5.64 |
| 6,779,719 B2 | * | 8/2004 | Guindulain Vidondo | 235/381 |
| 6,829,467 B2 | * | 12/2004 | Ochiai | 455/41.2 |
| 6,888,537 B2 | * | 5/2005 | Benson et al. | 345/173 |
| 6,992,565 B1 | * | 1/2006 | Giesler | 340/5.72 |
| 2001/0024157 A1 | * | 9/2001 | Hansmann et al. | 340/10.41 |
| 2002/0152123 A1 | * | 10/2002 | Giordano et al. | 705/14 |
| 2002/0198849 A1 | * | 12/2002 | Piikivi | 705/76 |
| 2003/0125017 A1 | * | 7/2003 | Greene et al. | 455/414 |
| 2003/0146821 A1 | * | 8/2003 | Brandt | 340/10.1 |

FOREIGN PATENT DOCUMENTS

| | | |
|---|---|---|
| EP | 1 024 626 A | 8/2000 |
| EP | 1 168 678 A | 1/2002 |
| EP | 1298822 | 4/2003 |
| JP | 2001-352298 | 12/2001 |

OTHER PUBLICATIONS

Hachisuka, et al., "Development of Devices for Communication through Human Bodies", *Micromechatronics* (*Horological Institute of Japan Journal*), vol. 43, No. 2, pp. 53-64 (2002).

Matsushita, et al., "Wearable Key: Device for Personalizing Nearby Environment", *IEEE*, pp. 119-126 (2000).

Zimmerman, "Personal Area Networks: Near-field Intrabody Communication", *IBM Systems Journal*, vol. 35, Nos. 3 & 4, pp. 609-617 (1996).

* cited by examiner

SALES APPARATUS AND METHOD OF TRANSMITTING AND RECEIVING MERCHANDISE INFORMATION BY ELECTRIC FIELD INDUCED IN HUMAN BODY

CROSS REFERENCE TO RELATED APPLICATION

This application claims benefit of priority under 35 U.S.C. § 119 to Japanese Patent Application No.2002-289857, filed on Oct. 2, 2002, the entire contents of which are incorporated by reference herein.

BACKGROUND OF THE INVENTION

1. Field of the Invention

The present invention relates to a button apparatus employing a transceiver used for data communication with, for example, a wearable computer. In particular, the present invention relates to a button apparatus employing a transceiver that transmits and receives information by inducing an electric field in an electric-field propagating medium according to information to be transmitted and by detecting an electric field induced in the electric-field propagating medium.

2. Description of Related Art

Figure 1:
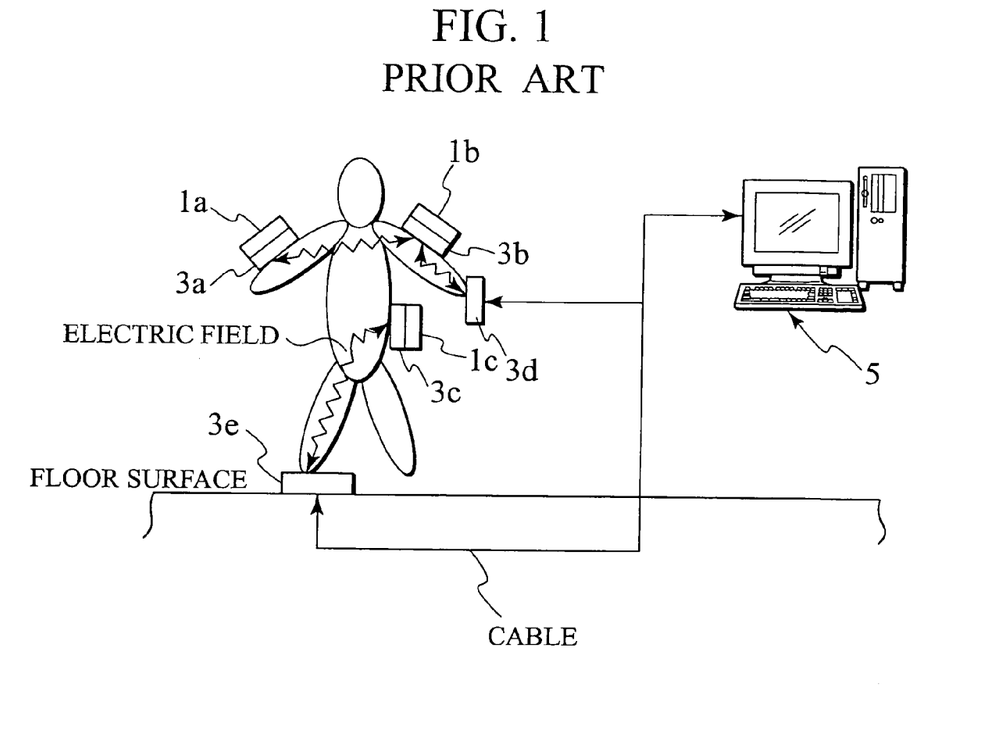
FIG. 1 is an explanatory view showing examples of wearable computers and transceivers put on a human.

Reduced size and improved capabilities of portable terminals have brought attention to wearable computers. FIG. 1 shows examples of wearable computers put on and used by a human. In FIG. 1, the wearable computers 1a, 1b, and 1c are provided with transceivers 3a, 3b, and 3c, respectively, and are put on, for example, the arm, shoulder, and torso of a user, to communicate data among them. Transceivers 3d and 3e are installed on, for example, the wall and floor so that they can be touched with the tip of a hand or foot of the user, to enable the wearable computers 1a, 1b, and 1c to communicate with an external personal computer (PC) 5 through the transceivers 3d and 3e and cables.

Each of the transceivers 3 used for communication among the wearable computers 1 and between the wearable computers 1 and the PC 5 utilizes a signal detection technique based on electro-optic means employing laser beams and electro-optic crystals. Namely, the transceiver 3 induces an electric field in the body of the user serving as an electric-field propagating medium according to information to be transmitted and uses the induced electric field to communicate information (Japanese Unexamined Patent Application Publication No. 2001-352298).

Now, to purchase a commodity from, for example, a vending machine, one must carry money, insert the money into the vending machine, select a commodity, and thus purchase the commodity.

In this procedure of purchasing a commodity, one encounters a problem that he or she must take various steps until getting a required commodity. The steps include taking money out of a purse, inserting the money into a vending machine, selecting a commodity, picking up change, and the like.

SUMMARY OF THE INVENTION

In consideration of the above situation, an object of the present invention is to provide a button apparatus employing a transceiver that transmits and receives information by inducing an electric field in an electric-field propagating medium according to information to be transmitted and by detecting an electric field induced in the electric-field propagating medium, thereby simplifying the processes of purchasing commodities and receiving services.

In order to accomplish the object, a first aspect of the present invention provides a button apparatus used in a communication network environment employing a plurality of transceivers each transmitting and receiving information by inducing an electric field in a human body serving as an electric-field propagating medium according to information to be transmitted and by detecting the electric field induced in the human body. The button apparatus is pressed down by a user, who wears a first transceiver among the plurality of transceivers and a first computer that is connected to the first transceiver and keeps monetary information, to obtain a commodity or a service from a commodity/service providing apparatus.

The button apparatus includes a conductive pusher to be touched and pressed down with the body of the user when the user intends to obtain a commodity or a service from the commodity/service providing apparatus, a second transceiver among the plurality of transceivers, to be enabled to communicate with the first transceiver by propagation of the electric field induced in the pusher when the body of the user touches the pusher, a switch to transfer press information of the pusher when the pusher is pressed down, to a second computer that is connected to the second transceiver and conducts an electronic settlement by communicating monetary information with the first computer, and an insulator to prevent the electric field induced in the pusher from leaking to the switch.

According to the first aspect of the present invention, the body of the user wearing the first transceiver and first computer may touch the pusher to enable communication between the first and second transceivers through the body of the user, to transfer monetary information between the first and second computers. When the pusher is pressed down, press information is transferred to the second computer. Only by touching and pushing the button apparatus on the commodity/service providing apparatus, the user can obtain a commodity or a service from the commodity/service providing apparatus. In this way, the first aspect simplifies the procedure of purchasing commodities or receiving services.

A second aspect of the present invention provides the button apparatus of the first aspect with a plurality of pairs of the pusher and switch.

According to the second aspect of the present invention, the commodity/service providing apparatus may have a plurality of menu items to be chosen, and the user can touch and press down one of the pushers of the button apparatus to choose and purchase or receive a required commodity or service. In this way, the second aspect simplifies the procedure of purchasing commodities or receiving services.

A third aspect of the present invention provides each pair of the plurality of pairs of the pusher and switch of the second aspect with the second transceiver.

A fourth aspect of the present invention allows each of the second transceivers to add information for identifying itself to information transferred in a communication with the second computer.

According to the fourth aspect of the present invention, communication conducted between the first transceiver and any one of the second transceivers through the body of the user can transfer press information to the second computer according to the identification information such as address information of the second transceiver.

A fifth aspect of the present invention provides the pusher of any one of the first to fourth aspects with a protective thin film that covers the pusher and prevents deterioration of the conductivity of the pusher.

The fifth aspect of the present invention prevents deterioration of the conductivity of the pusher and improves the durability of the button apparatus.

The nature, principle and utility of the invention will become more apparent from the following detailed description when read in conjunction with the accompanying drawings.

DETAILED DESCRIPTION OF EMBODIMENTS

Embodiments of the present invention will be explained with reference to the accompanying drawings.

Figure 2:
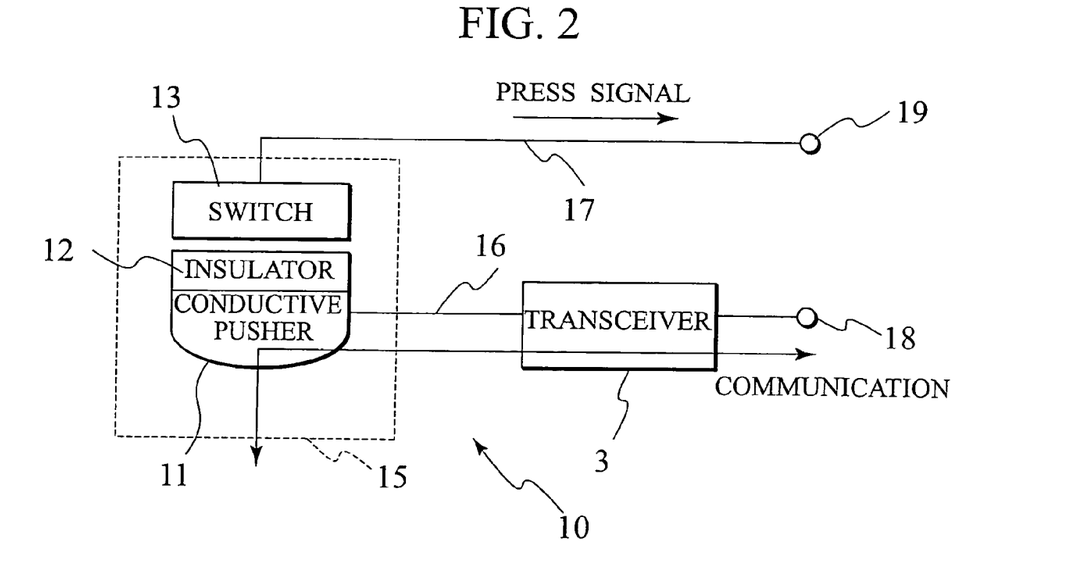
FIG. 2 is a schematic view briefly showing a button apparatus according to an embodiment of the present invention.

FIG. 2 shows an example of the structure of a button apparatus 10 according to an embodiment of the present invention. The button apparatus 10 is an apparatus provided for, for example, a vending machine and to be touched and pressed with the body of a user who wants to purchase a commodity from the vending machine. By pressing down the button apparatus 10, the user can purchase a required commodity from the vending machine. The button apparatus 10 has a button unit 15 and a transceiver 3. The button unit 15 consists of a conductive pusher 11, an insulator 12, and a switch 13. A user puts on a wearable computer 1 and a user's transceiver 3. When the body of the user touches and presses down the pusher 11 of the button unit 15, communication between the transceiver 3 of the button apparatus 10 and the user's transceiver 3 is established through the conductive pusher 11 and the body of the user, and at the same time and separately, communication of providing a press signal is established due to the pressing of the button apparatus 10.

Figure 3:
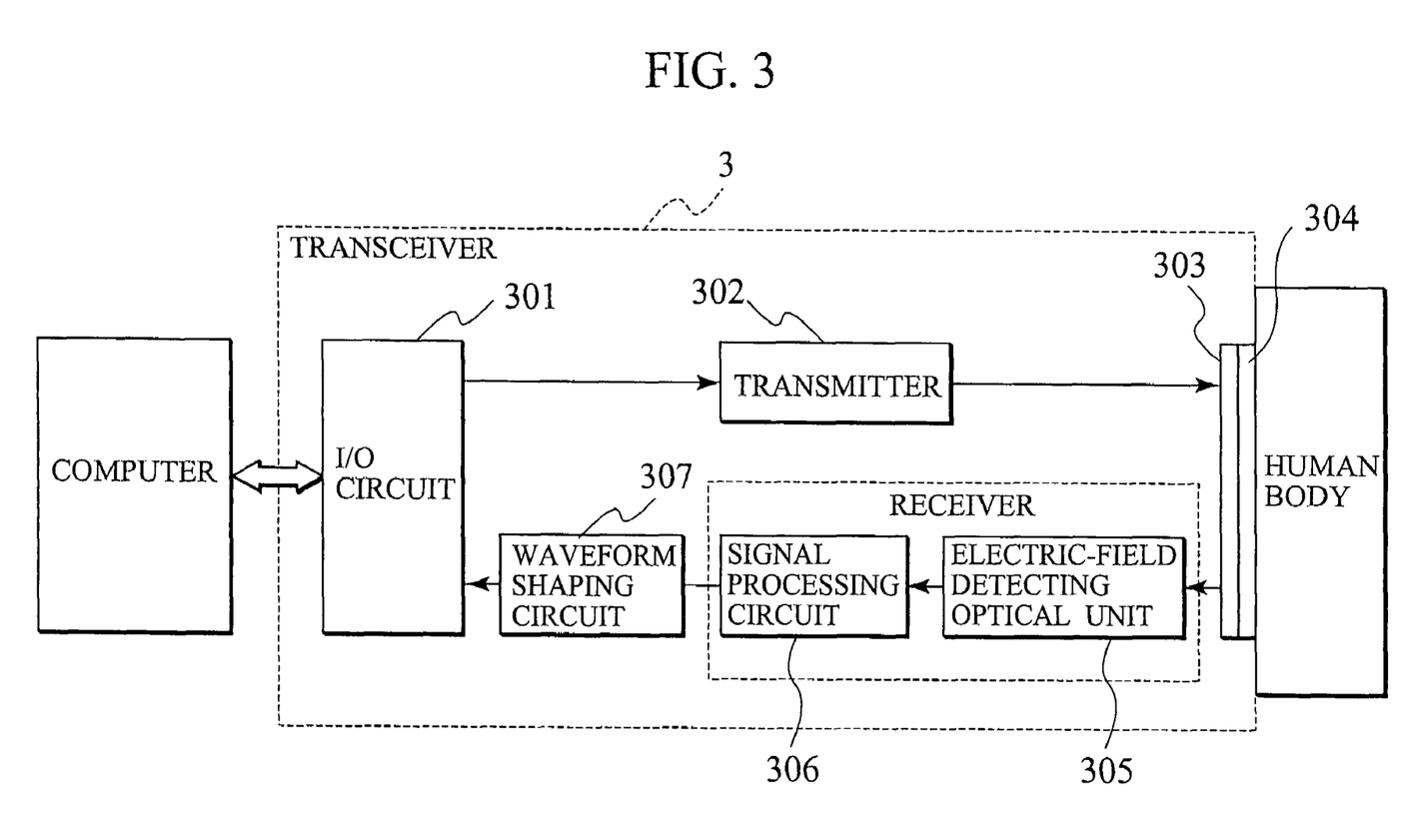
FIG. 3 is a block diagram showing a transceiver circuit provided for the button apparatus of FIG. 2.

FIG. 3 shows the details of the transceiver 3. In FIG. 3, a transmission/reception electrode 303 detects, through an insulation film 304, an electric field induced in the human body by another transceiver attached to the human body and propagated therefrom. The detected electric field is received by an electric-field detecting optical unit 305 and is converted thereby into an electric signal. The electric signal is amplified and processed for noise removal by a signal processing circuit 306 and is waveform-shaped by a waveform shaping circuit 307. The waveform-shaped signal is passed through an input/output (I/O) circuit 301 to the computer.

The transceiver 3 receives, at the I/O circuit 301, transmission data from the computer. The received transmission data is passed through a transmitter 302 to the transmission/reception electrode 303. Through the electrode 303 and insulating film 304, the transmission data induces an electric field in the body, and the induced electric field is propagated through the body.

The conductive pusher 11 is made of a conductor, and when it is touched with the body of the user, induces an electric field in the body. The electric field induced in the body is propagated through the pusher 11 and a communication line 16 to the transceiver 3 of the button apparatus 10. This establishes mutual communication between the transceiver 3 of the button apparatus 10 and the user's transceiver 3 put on the user. At the same time, the transceiver 3 of the button apparatus 10 becomes connectable to an external device (for example, a computer) through a connection terminal 18.

When the user presses down the conductive pusher 11, the pusher 11 gives the pressed action to the switch 13.

When the pusher 11 is pressed down, the switch 13 provides a press signal to a connection terminal 19 through a signal line 17. The connection terminal 19 is connected to an external device such as a computer.

The insulator 12 is provided to surely transfer an electric field induced at the conductive pusher 11 to the transceiver 3 of the button apparatus 10 without weakening the induced electric field. Namely, the insulator 12 prevents the induced electric field from leaking to the switch 13.

Next, a vending machine 100 employing the button apparatus 10 mentioned above will be explained with reference to FIG. 4. A user who uses the vending machine 100 puts on a wearable computer group 200 having an electronic wallet function. The wearable computer group 200 includes a wallet manager 201 to manage electronic money and a transceiver 3f.

Figure 4:
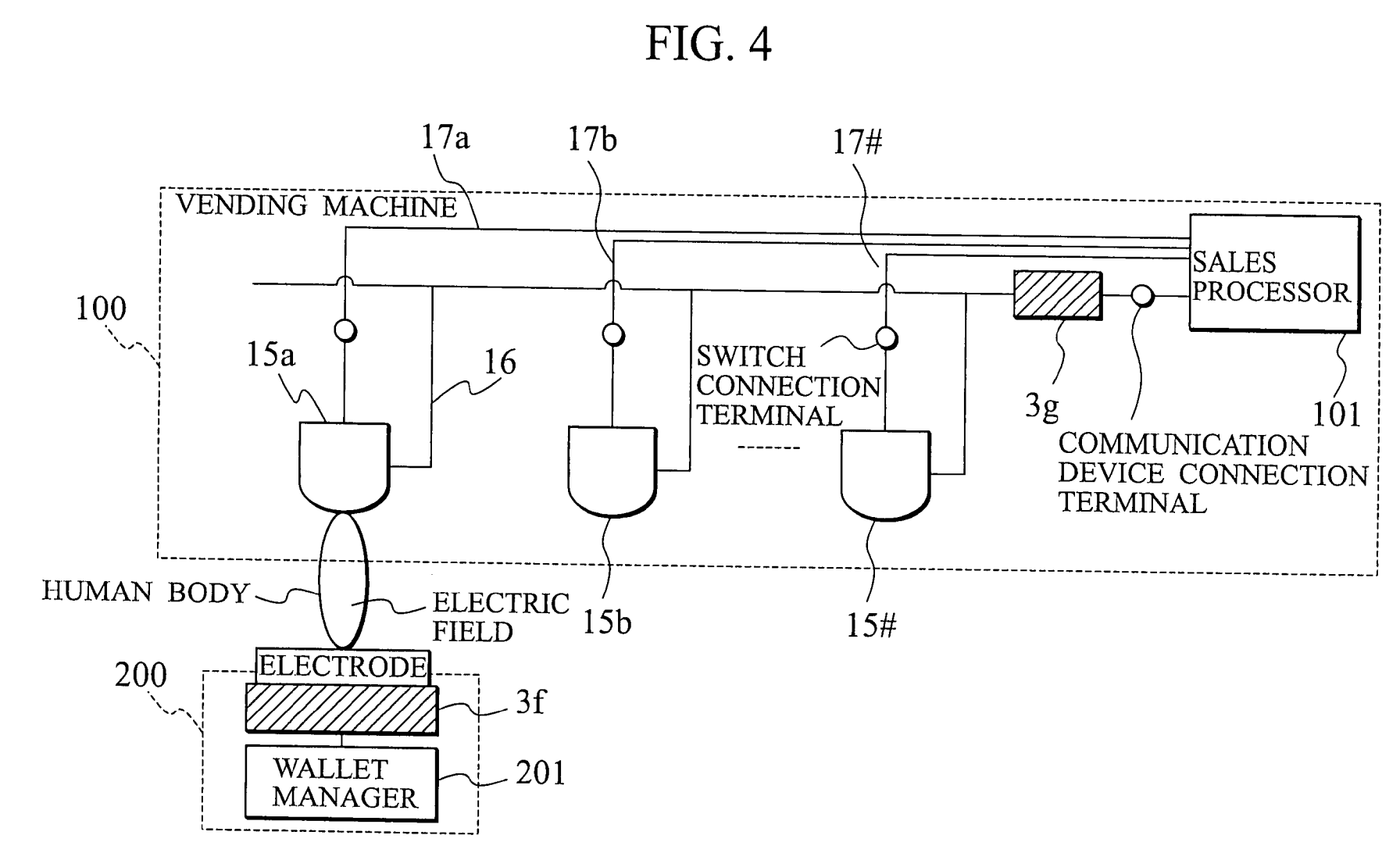
FIG. 4 is a schematic view briefly showing a vending machine employing the button apparatus of FIG. 2.

The vending machine 100 has a plurality of commodity selection button units 15a, 15b, and the like and a purchase determination button unit 15# having a purchase determination function. These button units 15a, 15b, . . . , 15# are connected to a sales processor 101 through different signal lines 17a, 17b, . . . , 17#, respectively. When the user presses down one of the button units 15a, 15b, . . . , 15#, the vending machine 100 can identify the pressed button and provide a press signal serving as commodity selection information or purchase determination information to the sales processor 101 through a corresponding one of the signal lines 17a, 17b, . . . , 17#.

When the body of the user touches one of the buttons 15a, 15b, . . . , 15#, a communication path is established between the transceiver 3f and a transceiver 3g of the vending machine 100 through the body of the user and a communication line 16, so that electronic money information can be communicated between the wallet manager 201 and the sales processor 101.

The sales processor 101 receives commodity selection information or purchase determination information through the signal line 17 and communicates electronic money information with the wallet manager 201 through the body of the user, thereby managing the sales of commodities.

Figure 5:
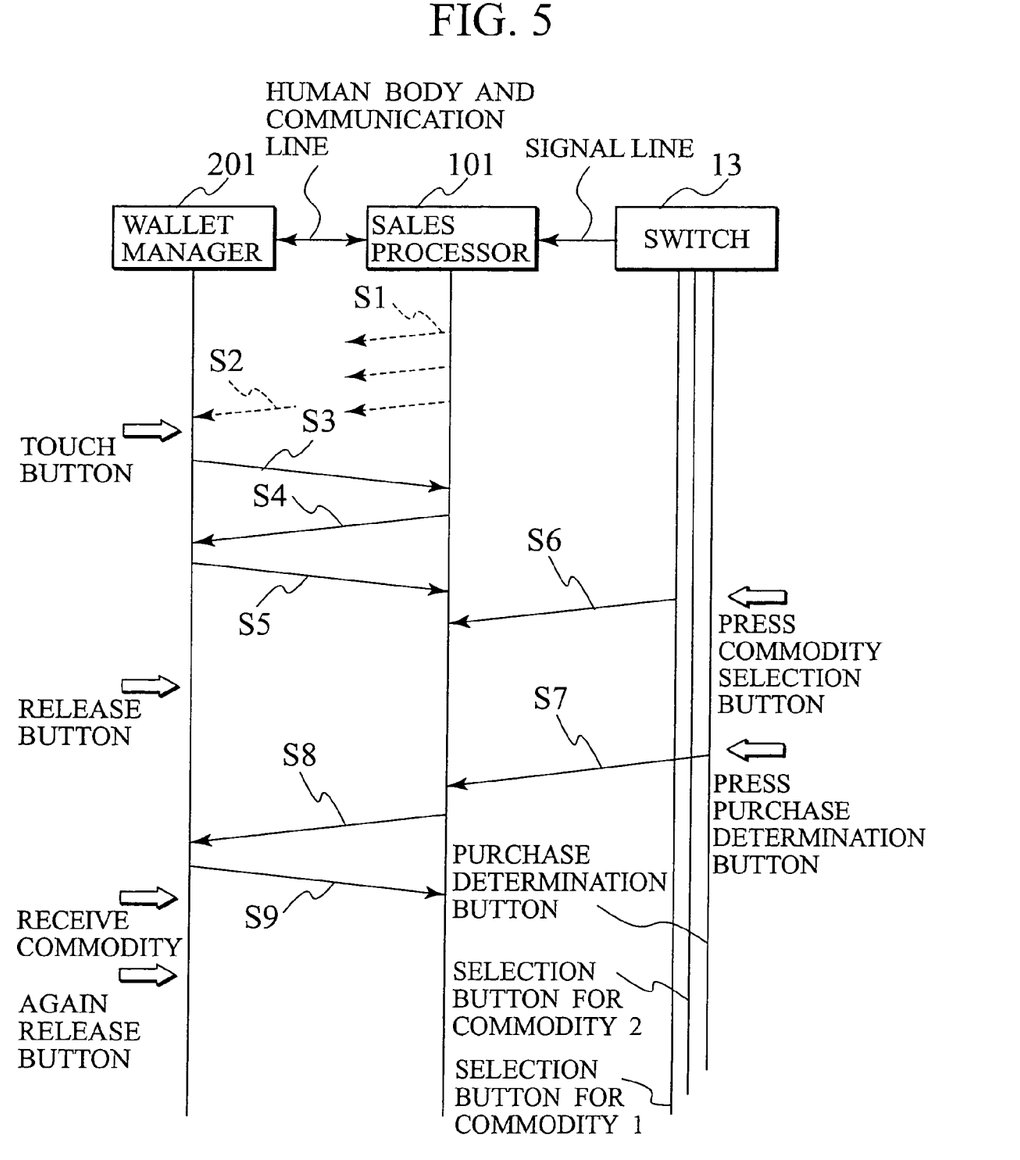
FIG. 5 is a sequence diagram showing the operation of the vending machine of FIG. 4.

The operation of the vending machine 100 will be explained with reference to FIG. 5 that shows communication between the wallet manager 201 and the sales processor 101.

Without regard to presence of communication with an opposite party, the sales processor 101 regularly sends a communication packet (connection confirmation packet) to inform of the presence of the vending machine 100 (step S1). If the body of the user touches one of the commodity selection button units 15 (for example, the button unit 15a for selecting a commodity 1), a communication path is established between the wallet manager 201 and the sales processor 101 through the body of the user, and the wallet manager 201 detects the connection confirmation packet sent from the sales processor 101 (step S2). Accordingly, the wallet manager 201 requests the sales processor 101 to start a purchase process (step S3). Then, the sales processor 101 requests the wallet manager 201 for the amount of money kept in the wallet manager 201. In response to the request, the wallet manager 201 provides the sales processor 101 with the amount of money kept in the wallet manager 201 (steps S4 and S5).

When the body of the user touches and presses down one of the commodity selection button units 15 (for example, the button unit 15a for selecting the commodity 1), the pressed button unit 15 sends a press signal to the sales processor 101. According to the press signal, the sales processor 101 determines the selected commodity (for example, the commodity 1) (step S6).

Thereafter, the user releases the pressed button unit 15, to disconnect the communication path between the wallet manager 201 and the sales processor 101 through the body of the user. This disables data communication through the communication path.

Next, the body of the user presses the purchase determination button unit 15#. At first, the user touches the button unit 15#, to again establish the communication path between the wallet manager 201 and the sales processor 101 through the body of the user. Then being pressed, the pressed button unit 15# sends a press signal to the sales processor 101. Based on the press signal, the sales processor 101 finally determines the purchase of the commodity (step S7). According to the information about the amount of money of the user, the sales processor 101 determines whether the user can pay for the commodity, and if the user can, requests the wallet manager 201 to pay for the commodity (step S8). Receiving the payment request, the wallet manager 201 pays the requested amount of money (step S9). Thereafter, the user receives the commodity and confirms the balance after deducting the payment for the commodity. When the user releases the button unit 15#, the communication path between the wallet manager 201 and the sales processor 101 through the body of the user is disconnected to terminate the commodity purchasing procedure.

Although the operation explained above selects and purchases a single commodity, purchasing a plurality of commodities is also possible. In this case, the commodity selection button units 15a, 15b, and the like are sequentially pressed down as required, and then, the purchase determination button unit 15# is simply pressed down to purchase the required commodities.

In the commodity purchasing procedure mentioned above, a need may arise to cancel the selection of a commodity. In this case, a selection cancel button unit may separately be arranged to cancel a selected commodity by pressing down the button. Instead, the canceling of a selected commodity may be achieved by again pressing the commodity selection button unit 15 that has been pressed down to select the commodity.

In this way, the button apparatus 10 according to the embodiment employs the transceiver that transmits and receives information by inducing an electric field in an electric-field propagating medium according to information to be transmitted and by detecting an electric field induced in the electric-field propagating medium. A user wearing the wearable computer group 200 having electronic money information simply touches and presses down the button apparatus 10 when purchasing one or more commodities. The embodiment, therefore, realizes a simple purchasing procedure.

Communication between the vending machine 100 and the wearable computer group 200 is peer-to-peer communication conducted through a human body, and therefore, can improve the security of an electronic settlement compared to communication using a wired or wireless network computer system.

Figure 6:
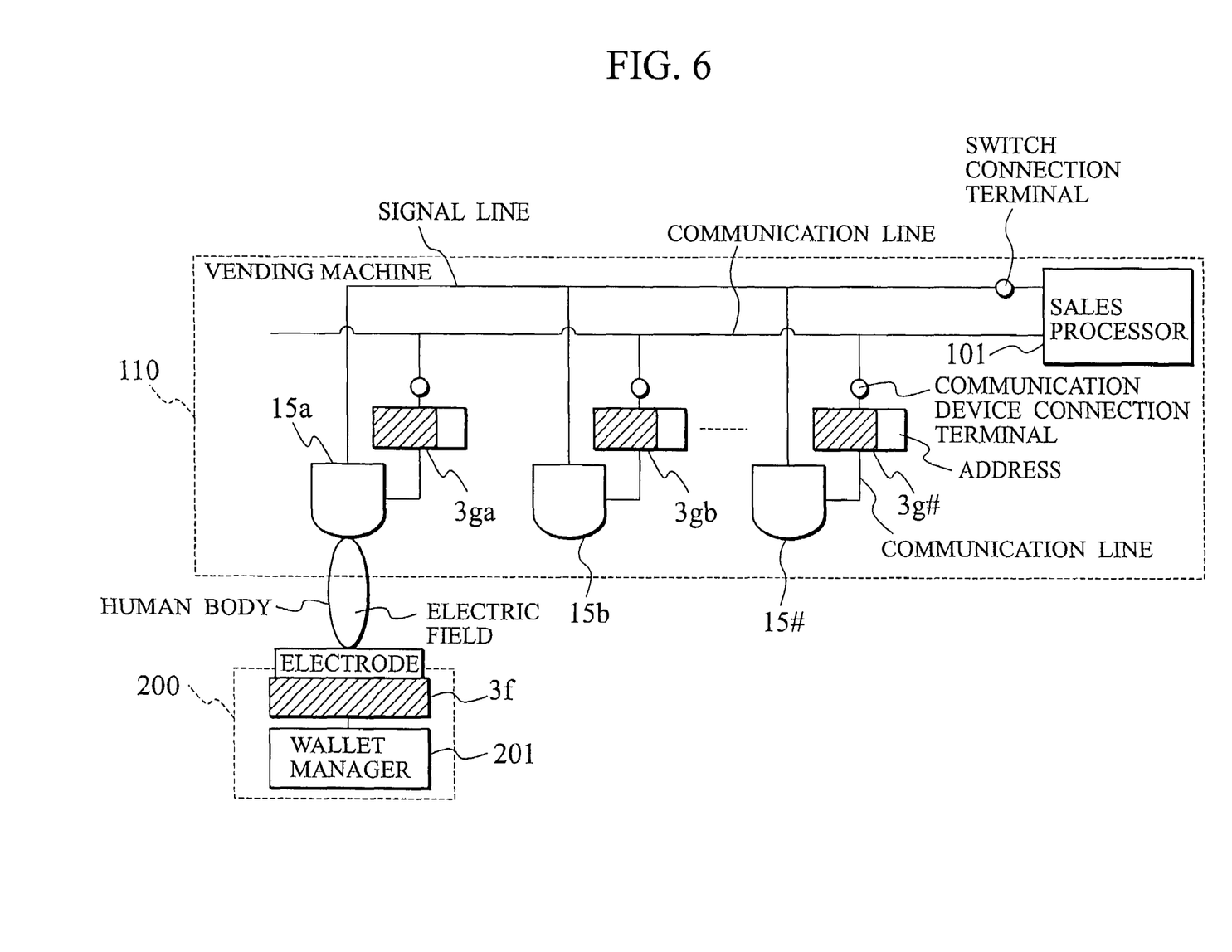
FIG. 6 is a schematic view briefly showing a vending machine employing a button apparatus according to another embodiment of the present invention.

Although the present invention has been explained in the form of one embodiment, other embodiments, changes, and modifications will be possible for the present invention without departing from the spirit and scope of the present invention. For example, the embodiment mentioned above includes commodity selection information or purchase determination information in a pressed signal. Instead, as shown in FIG. 6, transceivers 3g (3ga, 3gb, ..., 3g#) may be provided for commodity selection button units 15a, 15b, and the like and a purchase determination button unit 15#, respectively, to conduct communication through the body of a user with the use of communication packets containing the addresses of the transceivers 3g. This enables the communication through the body of a user to identify each transceiver 3g. Namely, commodity selection information or purchase determination information can be included in data to be communicated through the body of a user.

Figure 7:
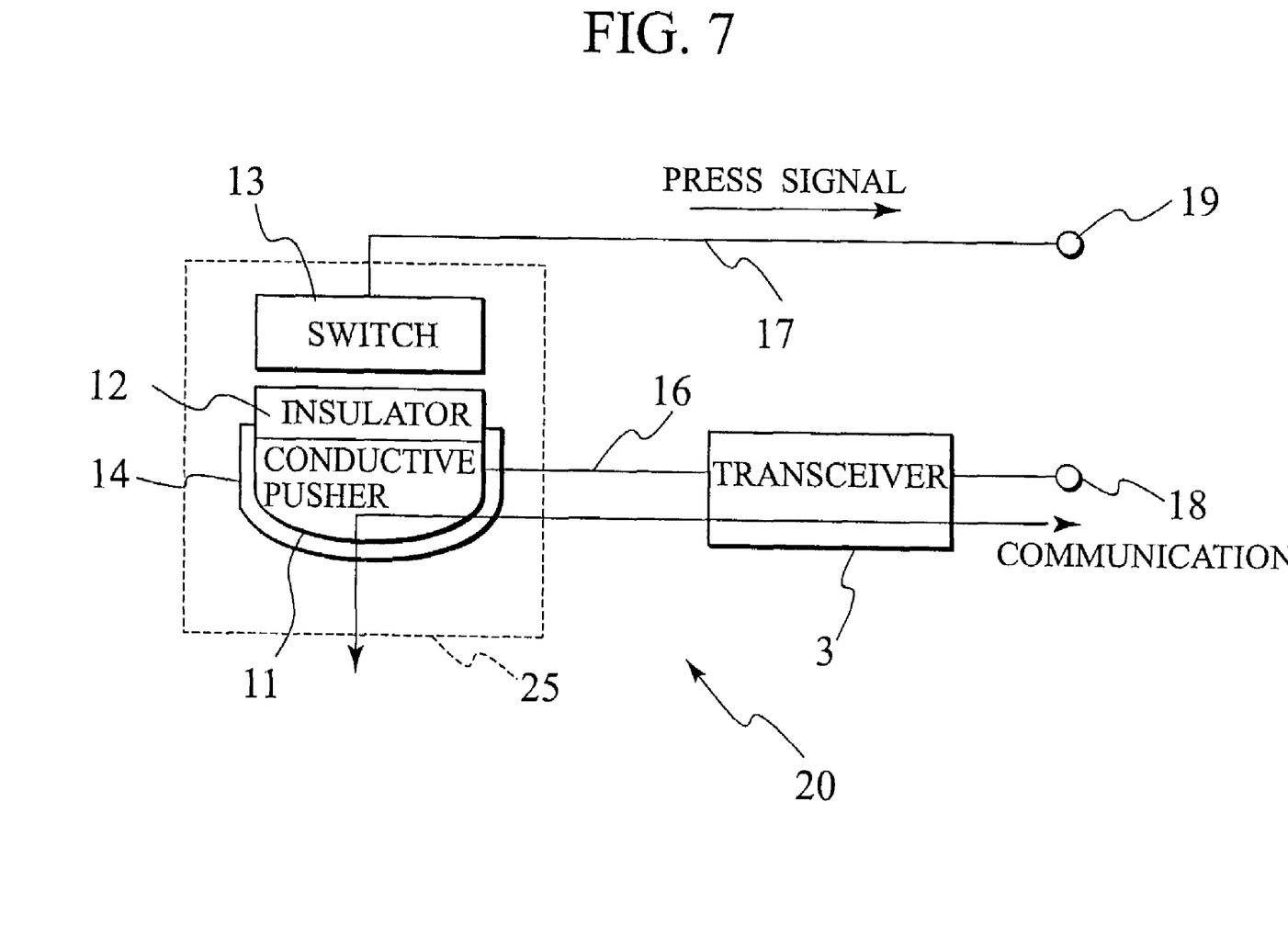
FIG. 7 is a schematic view briefly showing a button apparatus covered with a protective thin film according to still another embodiment of the present invention.

According to the button apparatus 10 of any one of the embodiments mentioned above, the body of a user directly touches the conductive pusher 11 of the button unit 15. Instead, as shown in FIG. 7, the conductive pusher 11 may be covered with a protective thin film 14 to prevent the deterioration of conductivity of the pusher 11 due to, for example, rust. An electric field induced in the body of a user is propagated to the conductive pusher 11 even if the pusher 11 is covered with the protective thin film 14. This configuration prevents the corrosion of the button apparatus and improves the durability thereof.

Each embodiment mentioned above relates to a standard automatic vending machine having a plurality of button units and one or more transceivers, and the present invention is preferably applicable to such a machine. The present invention, however, is naturally applicable to an apparatus having a single button unit and a single transceiver.

In each embodiment mentioned above, the button apparatus has been applied to a vending machine for vending commodities. This does not limit the present invention. The present invention is naturally applicable to an apparatus that provides services instead of commodities.

As explained above, the button apparatus according one embodiment of the present invention employs a transceiver that transmits and receives information by inducing an electric field in an electric-field propagating medium according to information to be transmitted and by detecting an electric field induced in the electric-field propagating medium, to thereby simplify the processes of purchasing commodities and receiving services and reduce human labor.

It should be understood that many modifications and adaptations of the invention will become apparent to those skilled in the art and it is intended to encompass such obvious modifications and changes in the scope of the claims appended hereto.

What is claimed is:

1. A sales apparatus comprising:
   a wearable computer which a user wears and which includes:
      a wallet manager configured to manager electric money information; and
      a first transceiver configured to transmit and receive information by inducing an electric field in a body of the user serving as an electric-field propagating medium according to information to be transmitted and by detecting the electric field induced in the human body; and a vending machine including:

a sales processor configured to manage sales of commodities;

a second transceiver connected to the sales processor; and a plurality of commodity selection buttons each corresponding to a commodity and including:

a conductive pusher connected to the second transceiver and touched and pressed down with the body of the user when the user intends to obtain the corresponding commodity from the vending machine;

a switch connected to the sales processor and configured to transfer press information of the conductive pusher when the conductive pusher is pressed down, to the sales processor; and an insulator disposed between the conductive pusher and the switch to prevent the electric field induced in the pusher from leaking to the switch, wherein the sales processor regularly sends a connection confirmation packet to inform the wallet manager of the presence of the vending machine, and when the body of the user touches one of the conductive pushers, a communication path is established between the wallet manager and the sales processor via the first transceiver, the body of the user, the conductive pusher, and the second transceiver so that the wallet manager detects the connection confirmation packet sent from the sales processor and sends the electric money information stored therein to the sales processor, and when the body of the user pushes down the conductive pusher, the switch transfers the press information to the sales processor, which determines the commodity selected by the user based on the press information and requests the wallet manager to pay for the selected commodity.

2. A method of transmitting and receiving merchandise information by using a sales apparatus comprising;

a wearable computer which a user wears and which includes:

a wallet manager configured to manage electric money information; and a first transceiver configured to transmit and receive information by inducing an electric field in a body of the user serving as an electric-field propagating medium according to information to be transmitted and by detecting the electric field induced in the human body; and a vending machine including:

a sales processor configured to manage sales of commodities;

a second transceiver connected to the sales processor; and a plurality of commodity selection buttons each corresponding to a commodity and including:

a conductive pusher connected to the second transceiver and touched and pressed down with the body of the user when the user intends to obtain the corresponding commodity from the vending machine;

a switch connected to the sales processor and configured to transfer press information of the conductive pusher when the conductive pusher is pressed down, to the sales processor; and an insulator disposed between the conductive pusher and the switch to prevent the electric field induced in the pusher from leaking to the switch, the method comprising the steps of:

sending regularly by the sales processor a connection confirmation packet to inform the wallet manager of the presence of the vending machine;

detecting by the wallet manager the connection confirmation packet sent from the sales processor through a communication path established between the wallet manager and the sales processor via the first transceiver, the body of the user, the conductive pusher, and the second transceiver when the body of the user touches one of the conductive pushers;

sending by the wallet manager the electric money information stored therein to the sales processor;

transferring by the switch the press information to the sales processor when the body of the user pushes down the conductive pusher;

determining by the sales processor the commodity selected by the user based on the press information; and requesting by the sales processor the wallet manager to pay for the selected commodity.

* * * * *